Aug. 17, 1943. R. H. MÜLLER 2,326,878
PHOTOELECTRIC PHOTOMETER
Filed June 17, 1941 4 Sheets-Sheet 4
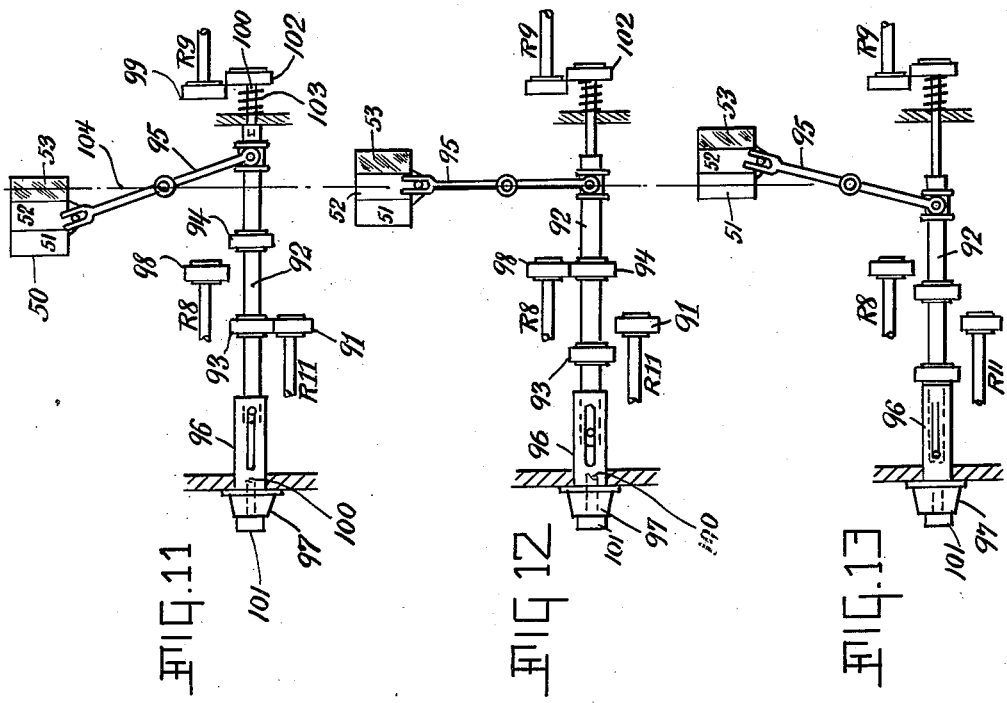
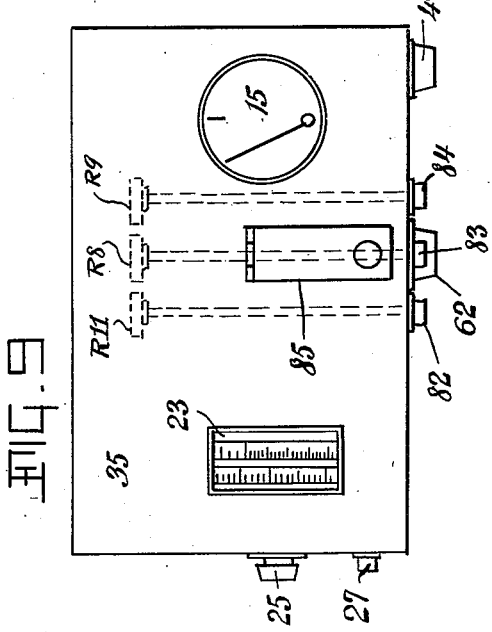
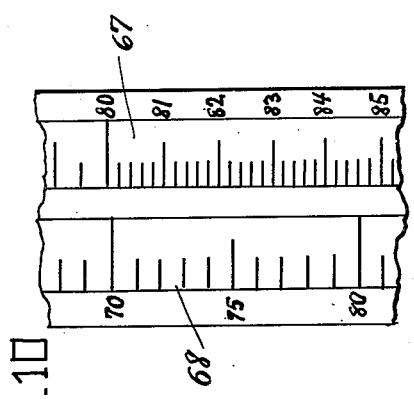
INVENTOR.
Ralph H. Müller
BY
Ivan E. A. Konigsberg
Atty.

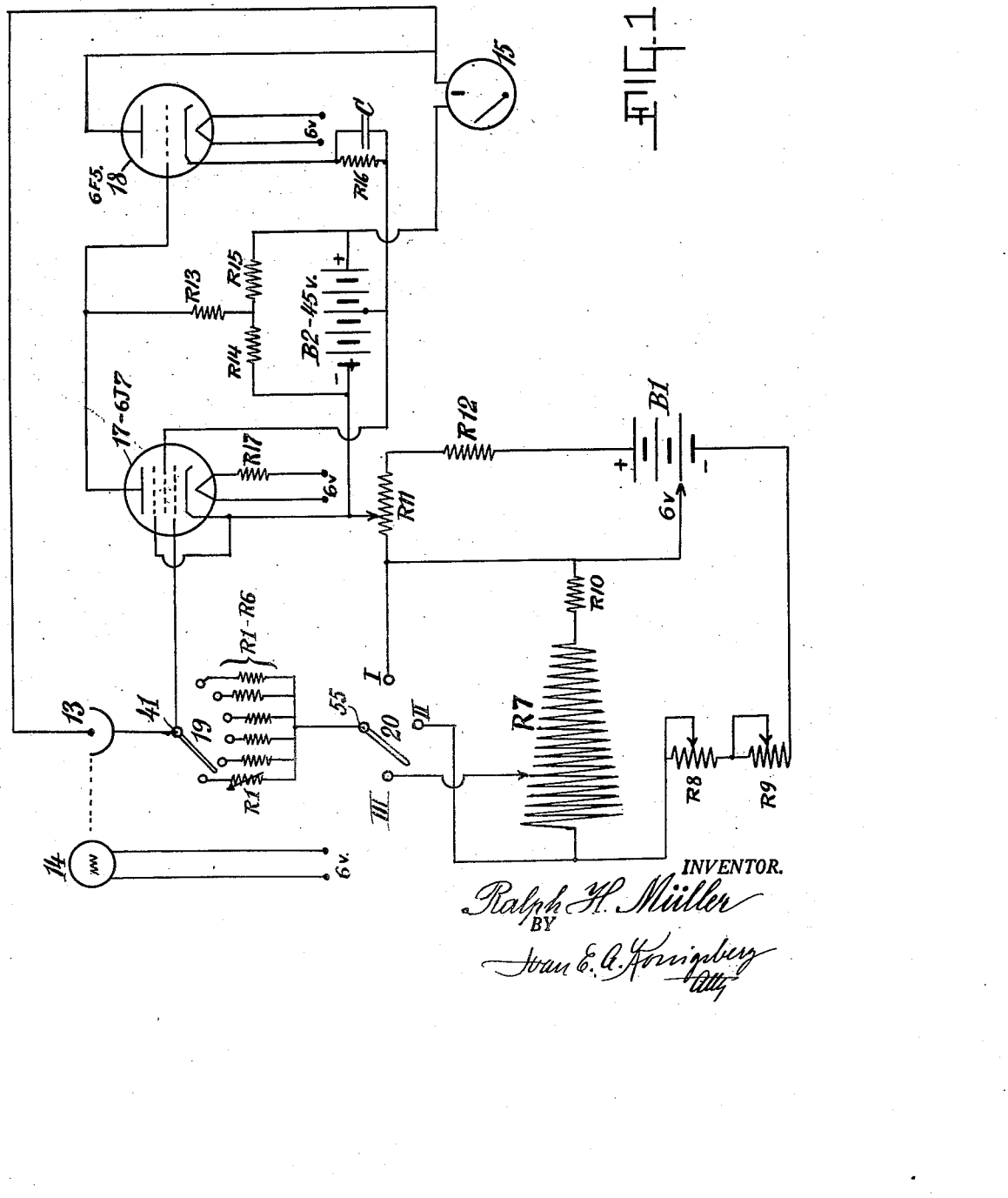

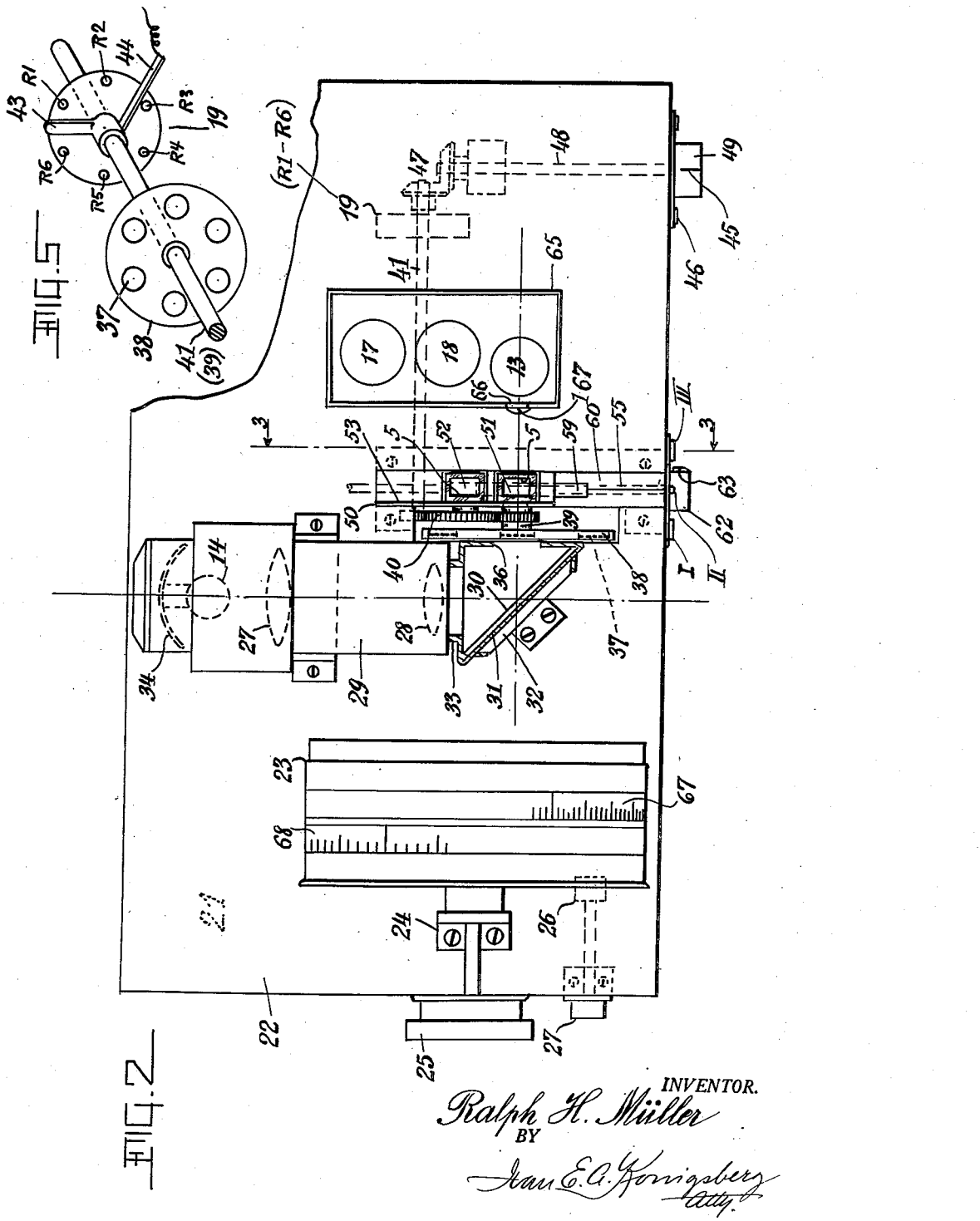

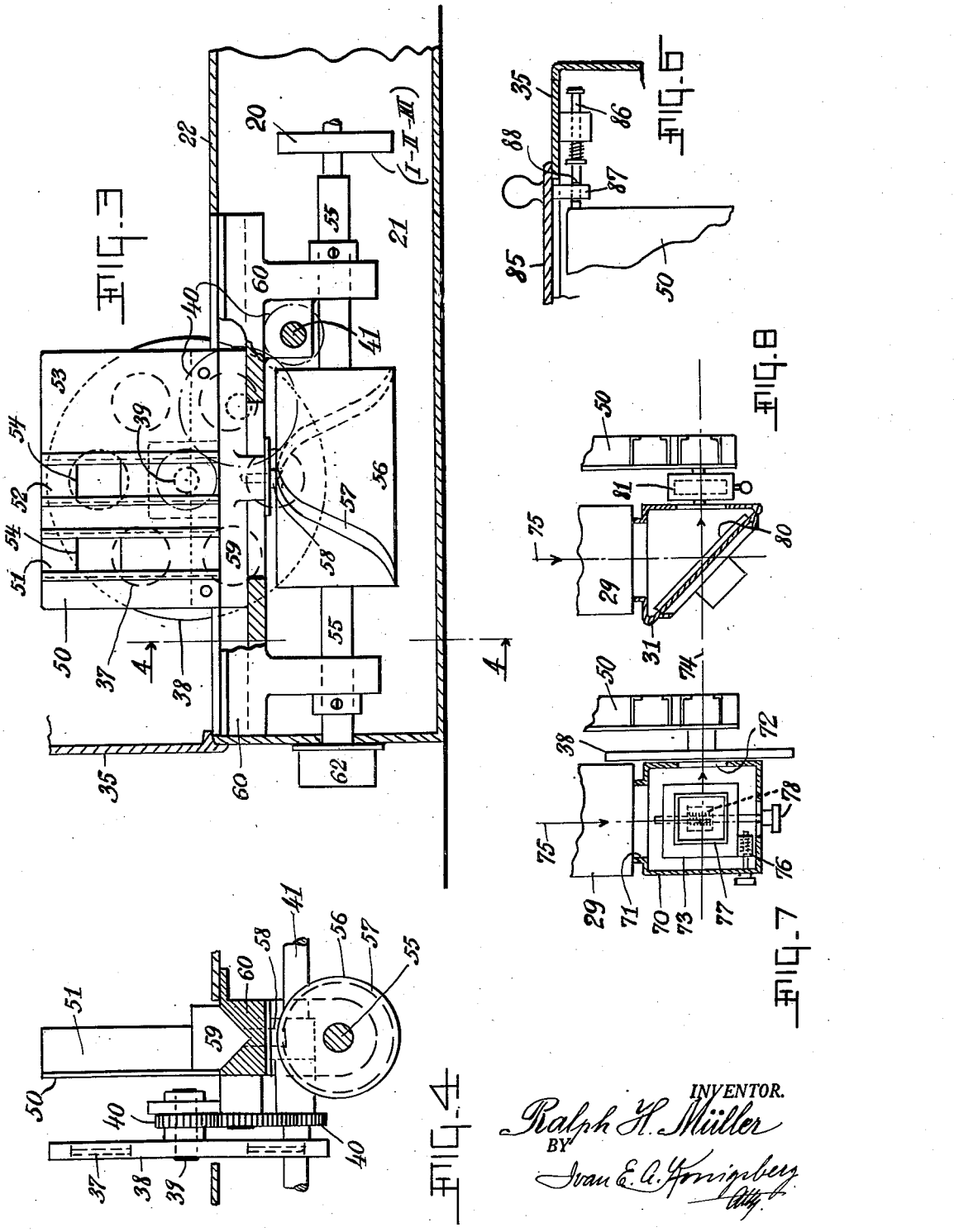

Patented Aug. 17, 1943

2,326,878

UNITED STATES PATENT OFFICE 2,326,878

PHOTOELECTRIC PHOTOMETER

Ralph H. Müller, New York, N. Y., assignor to
E. Leitz, Inc., a corporation of New York Application June 17, 1941, Serial No. 398,461

9 Claims. (Cl. 88—14)

This invention relates to vacuum tube photoelectric photometers. One object of the invention is to provide a photometer whereby absolute measurements of light intensities may be made with respect to a selected standard value. Another object of the invention is to provide a generally improved photometer having as one of its main features an electric circuit which includes functional input compensation for the purpose of obtaining direct linear readings of the values to be determined. For instance, the circuit may include logarithmic input compensation for obtaining direct linear readings of the extinction values of colored solutions. Other features and objects of the invention are to provide means for automatic operation between certain parts of the electric circuit controls and the positioning means for placing the absorption cells in the light beam. Also means providing for equal or constant sensitivity of the photoelectric cell in different selected regions of the spectrum and means whereby turbidity and lustre values may also be measured and determined while using and operating the same circuit as is used for determining extinction values. Other objects include automatic selection of and connection in the electric circuit of properly evaluated resistances to correspond with selected color filters and certain other improvements in the arrangement and operation of the several parts of the instrument whereby to generally improve the operation and use thereof. These and other features of the invention are embodied in a photometer of generally improved construction as hereinafter described and illustrated in the accompanying drawings in which Fig. 1 is a wiring diagram.

Fig. 2 is a plan view of the instrument with the cover removed. Some parts are in section and other parts are shown diagrammatically.

Fig. 3 is a sectional view of the mechanism for operating the absorption cells taken on the line 3—3 of Fig. 2.

Fig. 4 is a sectional view taken on the line 4—4 of Fig. 3.

Fig. 5 is a diagrammatic view of the mechanism for automatically selecting the proper resistance corresponding to a selected color filter.

Fig. 6 shows a locking device for the cover over the absorption cells.

Fig. 7 is a view of the turbidity measuring unit.

Fig. 8 is a view of the lustre measuring unit.

Fig. 9 is a plan view of the instrument with the cover closed.

Fig. 10 shows a portion of the logarithmic and linear scales.

Figs. 11, 12 and 13 illustrate a mechanism for locking the operating knobs in certain positions to avoid confusion and untimely operation.

The principal elements in the photometer according to this invention are a battery operated electric circuit which includes one or more vacuum amplifier tubes, a high vacuum photoelectric cell, an electric lamp, a microammeter, a logarithimically wound slide wire resistor provided with scales for direct readings of the values to be determined in the operation of the instrument, together with mechanisms for operating the mechanical and electrical parts. The instrument is mostly used for the purpose of comparing light intensities, for instance the determination of the amount of light which has been absorbed by a medium of unknown concentration or absorption as compared with that of a medium of known concentration or absorption, or for determining the amount of light which is reflected by a medium of unknown reflecting power as compared with that of a medium of known reflecting power.

However, the use of the instrument is not limited to measuring concentration or absorption. Essentially the instrument measures the decrease of light (from an arbitrarily selected maximum which is called 100%) which falls upon a photoelectric cell and which is caused either by absorption or reflection or any other interference with the passage of light to the photoelectric cell.

Referring now to Fig. 1 the electric circuit is preferably battery operated because of resulting high stability and simplicity of design and arrangement. The circuit herein disclosed is characterized by a low current drain so that frequent battery replacement is avoided. The circuit includes a high vacuum photoelectric cell 13, an incandescent lamp 14 and a microammeter 15, hereinafter called the meter. The lamp may receive current from a six volts battery for instance the battery B1 as indicated in the diagram. The battery also supplies current to heat the filaments in the two vacuum tube amplifiers 17 and 18 which are of the types generally known as 6J7 and 6F5 respectively, or their characteristic equivalents. Current is supplied by a forty-five volts battery B2.

The instrument is arranged to operate with a selected number of color filters, the spectral ranges of which have been found to be the ones most wanted or used in this line of work. Various filters allow different amounts of light to pass to the photocell and the latter therefore in turn produces varying amounts of current, not having equal sensitivity for all spectral ranges. The photometer will therefore suffer from unequal sensitivity which results in lack of precision in the different regions of the spectrum. In order to obtain equal response of the photocell for the selected spectral ranges of the color filters there is provided a number of different resistances R1 to R6, each of which is selected in resistance value so as to yield effective electrical response of uniform magnitude independent of the filter selected. Thus when a certain filter is placed in the light beam and an appropriate corresponding resistance is included in the circuit the photocurrent will be substantially constant regardless of the spectral range of the filter. One feature of the invention is therefore the provision of means whereby the proper resistance is automatically included in the circuit when a selected filter is positioned in the light beam. In the claims the resistances R1 to R6 are therefore called corresponding resistances.

In Fig. 1 the numeral 19 denotes a switch which may be called a filter switch because it is operated from a shaft 41 which serves to position the filters in the light beam as will be explained hereafter. The diagram also includes another switch 20 which is operated by a shaft 55. The latter serves to position the absorption cells in the light beam and the switch 20 may therefore conveniently be called a cell switch. This switch has three positions I, II and III as indicated. The logarithmically wound slide wire resistor is marked R7. The windings of this resistor are logarithmically tapered so that uniform rotation thereof produces logarithmic increment or decrement of resistance. Other elements and resistances are parts of the circuit and will be referred to hereafter.

In general it may be said that the part of the circuit which includes the elements which in Fig. 1 are above the switch 20 and the resistance R11 may be called the amplifying part of the circuit. The other lower parts comprise the compensating part of the circuit.

Referring now to Figs. 2 to 5 the instrument may have a hollow base 21 which encloses the circuit and other operating parts, while still other parts are more conveniently mounted on top of the cover of the base. This is marked 22. A cover 35 is provided for protection, Fig. 9. The logarithmic resistor wire is wound upon a drum 23 supported in a bearing 24 and rotated by a knob 25. A fine adjustment is shown at 26 with an operating knob 27. The optical system for collecting and directing a beam of light from the lamp 14 comprises a reflector 34 and a lens system 27, 28 within a housing 29. The light beam is directed towards a reflecting mirror 30 supported in a triangular shaped housing 31 which is detachably mounted upon a bracket 32. The housing has a nipple 33 which slides down in front of the tubular lens housing 29 in light-tight relation. The housing 31 also has an opening 36 for directing the light towards the color filters, one at a time. The filters 37, 37 are in the usual manner detachably supported in a rotatable disk 38 carried by a stud shaft 39 which is geared as at 40 to the above mentioned shaft 41 which also operates the filter switch 19. The shaft 41 is geared at 47 to a filter operating shaft 48 actuated by a knob 49.

The shaft 41 carries a contact finger 43, Fig. 5, which in a known manner moves over and contacts the terminals of the six resistances R1 to R6. The positions of these latter correspond with the positions of the filters so that as the shaft 41 is rotated and a certain filter put into the light beam a corresponding resistance is connected by the finger 43 into the circuit as will be understood. The current to the contact finger may be supplied by way of a contact spring 44 or like well known device. The finger is of course insulated from the shaft 41.

It should be noted that the gearing 40 which in Figs. 2, 3 and 4 is interposed between the shafts 39 and 41 is omitted in Fig. 5 in order to simplify the illustration of the relation between the filter disk and the switch 19.

The instrument is shown as being provided with six filters and the knob 49 may have a mark 45 to be moved into registry with fixed marks 46 to indicate which filter is in the light beam. The marks 46 may be identified by the names of the colors of the filters. Thus when the mark 45 is in registry with a certain mark 46 the filter indicated by the latter will be automatically positioned in the light beam and the corresponding proper resistance of the resistances R1 to R6 will automatically be included in the circuit. The resistance R1 is a variable resistance for the purpose of enabling the operator to adjust it to suit a special filter which may not normally be included among the filters provided with the instrument but which the operator may otherwise obtain for testing for instance an unknown solution the color of which is not within the range of colors of the filters 37.

The absorption cells 5 are the ordinary type of glass vessels and are supported in a cell carriage 50, Figs. 3 and 4, which is provided with pockets 51 and 52 to receive the cells and also provided with light openings 54. A portion 53 of the carriage serves as a black out for the light beam. The carriage is moved across the light beam by rotation of a shaft 55 which carries a drum 56 having a spiral groove 57 which is engaged by a pin 58 depending from the base 59 of the carriage. The base slides in a grooved support 60 which also serves as a support for the shaft 41, the gearing 40 and the carriage operating shaft 55. This is merely a convenient arrangement and may be otherwise provided for. The cell carriage operating shaft 55 is actuated by a knob 62 which has a mark 63 which is moved into registry with fixed marks I, II or III upon the base to indicate to the operator the three positions of the carriage in the beam of light. The positions of these fixed marks correspond with the three positions of the switch 20 in the circuit so that when the mark 63 points to I, the black portion 53 is in the light beam and the switch 20 is in position 1 in the circuit. When the mark 63 points to II, the cell pocket 52 is in the light beam and the switch is in its position II. When the mark points to III the cell pocket 51 is in the light beam and the switch is in its position III, the parts being so designed as will be understood. The photoelectric cell and the two tubes 17 and 18 may be mounted within a housing 65 having a light admitting opening 66 with a collecting lens 167 for directing the light towards the cell. The housing may be airtight and contain a desiccant to maintain low humidity. The logarithmic resistor has a logarithmic scale 67 and a linear scale 68.

The operation for determining the modulus of extinction of an unknown solution is carried out as follows: The carriage will normally be in position I and the switch 20 will be in position I in the circuit. Then the operator turns the knob 49 to rotate the filter disk to bring a selected filter 37 into the beam of light. This rotation also operates the switch 19 whereby a corresponding resistance of the resistances R1 to R6 is automatically included in the circuit by the mechanism shown in Fig. 5. These operations affect the circuit in the following manner.

When the black out portion 53 of the carriage 50 is placed in the light beam the switch 20 is automatically put in its position I and R11 will then be operated in order to adjust the grid potential of the tube 17 so that the plate current of the tube 18 has the standard value indicated by the meter 15. If R11 is moved to the right in the drawing the plate current of tube 17 will decrease. If it is adjusted to the left, the plate current will increase. These plate current changes are transferred to the second tube 18 by a coupling resistance R13 and consequently the output of tube 18 will be changed and the change will be indicated by the meter 15. As the output of tube 17 increases the output of tube 18 will decrease and vice versa. The entire adjustment for this operation consists in adjusting R11 until the meter needle points to a selected standard value on the face of the meter. All subsequent adjustments are made to the same value. This adjustment may be called the dark postion or zero adjustment and has nothing specifically to do with photoelectric measurements but serves to put the circuit into standard operating condition based upon the selected predetermined value, i. e. 100%. It will be noted that the adjustment of the circuit to this standard value is done solely by the operation of the resistance R11 whereby, it is believed, this circuit is distinguished from other electric photometer circuits.

The operator then turns the knob 62 to move the mark 63 to position II. This operation places the pocket 52 in the light beam, a cell or tube containing the solvent alone having been placed in said pocket. When the switch 20 moves to its position II the condition of the circuit is changed and this is indicated by the needle of the meter deflecting from the standard position. The working current through the network R7, R8, R9 and R10 furnished by the battery B1 is now adjusted by means of the variable resistances R8 and R9. The adjustments continue until the needle again is in standard position on the meter. The explanation of this operation is as follows. At this setting of the instrument a maximum of light from the lamp 14 falls upon the photocell 13 after having passed through the solvent and the particular filter which has been selected. A photoelectric current is flowing through the cell and one of the resistances R1—R6. The direction of the flow in the conventional sense from positive to negative is from top to bottom, hence the grid of the tube 17 will become more positive and the reading of the meter will decrease. This effect is balanced or compensated for by causing a drop in the potential across the resistances R7 and R10. The said adjustments of R8 and R9 accomplish this result. The net result of the operations is to bring the needle back to the standard reading. The total potential across the measuring units R7 and R10 exactly balances the photoelectric signal which in turn is an exact measurement of the full or 100% light intensity. The operation may be called the sub-zero or full light adjustment. At this time it may be noted that there is no necessity for measuring the actual resistances prevailing in R11, R8 and R9 in black out and maximum light positions, respectively. These are merely preliminary adjusting elements operated for the purpose of standardizing the circuit so that the measurements may be absolute based upon the selected standard value.

The carriage is now moved to the third or final position whereby the pocket 51 containing a glass cell with the liquid of unknown concentration is placed in the light beam and the switch 20 is moved to position III. Since the solution is colored and absorbs some of the light the photocell current will decrease. Therefore the needle of the meter will show decreased deflection. It may be restored once more to its standard position by adjusting the slider on the logarithmic resistor R7 by means of which any fraction of the total potential across its terminals may be selected. The linear scale 68 on the drum 23 will read extinction directly since the absorption of substantially monochromatic light by the color of the solution is by nature exponential, i. e. it follows a logarithmic law.

The carriage may now be moved to positions II and I and in each case the needle will indicate the standard value. If small deviations are indicated on the rechecking movements they may be adjusted as described under each operation. Since the parts are mechanically interlocked such checks and re-adjustments are easily made. Minor details of the circuit conform to standard practise. They are familiar to the art and may be slightly changed without departing from the principle of the invention. They relate to the inclusion of the tube 17 to lower the electron emission and to improve the grid current characteristics, the use of a self biasing resistance R16 and a condenser C in the cathode lead of the tube 18 to exert a levelling action on the output of this tube to prevent excessive currents through the meter 15 during movements of the carriage. The values of the resistances R11, R12, R13 and R15 as well as the bias voltage connection to the battery B1 are subject to small changes as well as the sensitivity of the photocell which is used. The heaters of the tubes may be operated from the battery B1 which also supplies current to the lamp. Separate batteries may be used for these purposes if desired. Switches may be included in the battery circuits of B1 and B2 if long standing periods are involved. This is concerned with battery practise.

From the foregoing description it will be seen that the change in the current produced in the high vacuum photoelectric cell due to variations in the incoming light intensity after the circuit has been balanced and which is directly proportional to such variations is compensated directly by the logarithmic resistor. Readings are thus independent of the characteristics of the amplifier tubes since the adjustment of the circuit is essentially a null adjustment. In addition to this advantage the adjustment is made by means of a logarithmically wound slide wire as a result of which the operations automatically result in giving the desired information in terms of extinction values. The scale of the resistor R7 should not be calibrated in units of resistance. It is impossible to calibrate it directly in terms of concentration because the relation between concentration and absolute absorption varies for each chemical system. It has been customary to calibrate such scales in percentage of either transmission or absorption. This has certain disadvantages. The relation between concentration on the one side and transmission or absorption on the other side is not linear. It is therefore more advantageous to find a unit for the calibration of the scale for R7 which has a linear relation to the concentration or to the reciprocal value of the concentration. This is the negative logarithm of the concentration and is called the extinction coefficient. Other prior instruments have required the computation of the measured quantity of absorbed light. Another advantage resides in the fact that the operation is much simplified due to the automatic interlocking mechanisms referred to.

The instrument may be used for the measurements of turbidity values which are based upon the measurements of the relative intensities of Tyndall's light. For this purpose the bracket 32 and the reflecting mirror housing 31 in Fig. 2 are removed and replaced by a simple turbidity unit as shown in Fig. 7. Here the numeral 70 denotes a suitable housing which is placed in light-tight relation to the lens housing 29. The housing 70 has light openings 71 and 72. Inside the housing there is a base 73 which is movable along the optical axis 74 at right angles to the axis of the light beam indicated at 75. The axis 74 passes through the light opening 72 which is alined centrally with the cell 13. The moving means are indicated at 76. The base 73 supports a cell holder 77 in movable relation by means indicated at 78. Hence a cell, not shown, with the solution under investigation may be placed in the cell holder 77 and the latter adjusted axially along the two axes 74 and 75. The filters in the disk 38 are removed and the cell pockets in the carriage are empty. By adjusting the position of the cell holder 77 through the means 76 and 78 the distance which the Tyndall light travels through the solution under investigation may be adjusted and controlled. This is of importance since sometimes the Tyndall light may be absorbed by the solution and not pass through it at all. The operations of the instrument are the same as above described, i. e. the switch 20 is successively placed in the positions I, II and III but the filter disk is not rotated. The turbidity measurements may be read upon the scale 67 or 68 as desired.

The instrument may also be used for the measurement of lustre values by means of a unit such as is shown in Fig. 8. In this case the reflecting mirror is removed and the object 80 under investigation is suitably supported in the housing 31 under an angle of forty-five degrees to the incoming light. In addition the filter disk may be removed and a rotary polarizer 81 positioned in the axis 74. The necessary measurements may then be made under two different angles of polarization. The operation of the circuit is as above described.

Referring now to Fig. 9 it will be seen that in addition to the filter operating knob 49 and the cell carriage knob 62 there are three knobs 82, 83 and 84 for adjusting the resistances R11, R8 and R9 which are diagrammatically represented. As one of the features of the invention it may be found desirable to provide means whereby the operator may be assured that the cell carriage is in the proper position before the circuit is operated. To this end there is provided a separate hinged lid 85 in the cover 35. The lid is located directly above the cell carriage and so arranged that it cannot be opened unless the carriage is in the proper starting position with the black out portion in the light beam. As seen in Fig. 6 the lid 85 is provided with a depending catch 87 which is automatically engaged by a spring seated bolt 86 when the lid is closed. The catch holds the lid closed until the carriage is moved into position I. Then the carriage engages the bolt and pushes it back so that a cut out 88 in the bolt comes opposite the catch and the lid can now be opened. Before operating the instrument the operator must put the solution cells into the cell pockets in the carriage. This he cannot do unless the carriage is in position I or zero position. The operator is therefore warned to rotate the knob 62 to position I in order to gain access to the cells. Also in order to remove the solution cells the lid must be opened which again insures the carriage being in position I.

The operator thereafter adjusts the circuit by first turning the knob 82 to adjust R11, then by turning the second knob 83 to adjust R8 and then effects fine adjustment by turning the knob 84 to regulate R9. The logarithmic resistor is operated by turning the knob 25 and for fine adjustment the knob 27. As the last two are the last to be operated there is not much danger of untimely operation of these two knobs. It is however, desirable to provide some means to insure orderly sequential operation of the resistances R11, R8 and R9. Such means may be embodied in a mechanism illustrated in Figs. 11 to 13. In these figures the three resistances are represented by their operating shafts as shown. Each of these shafts carries a disk or wheel marked 91, 98 and 99 respectively. The disks and shafts are rotatably mounted in suitable bearings not shown. They are fixed axially. The particular arrangement of the parts in Figs. 11 to 13 is arbitrary for the sake of illustration. The driving means for rotating the resistance disks is so arranged that only one of the disks can be operated at a time. For this purpose there is provided an axially shiftable shaft 92 which carries a disk 93 to engage the disk 91 and a second disk 94 to engage the disk 98. The shaft 92 is moved axially by a lever 95 which engages and is actuated by the cell carriage 50 all as shown in the drawings. The shaft 92 is rotated by a sleeve 96 operated by a knob 97. Through the shaft 92 extends a rod 100, shown partly broken away, which is operated by a small knob 101. The rod 100 carries a disk 102 for rotating the third resistance disk 99. A spring 103 keeps the rod normally axially immovable. The operation is as follows:

In Fig. 11 the cell carriage 50 is in position I with the black out portion 53 in the light beam which is indicated by the line 104. In this position the resistance R11 may be adjusted by turning the knob 97, the disks 91 and 93 being engaged. The resistance R8 cannot now be adjusted. Next the carriage is moved to position II, Fig. 12. The shaft 92 is then automatically shifted to disengage 93 from 91 and cause 94 to engage 98 so that now resistance R8 may be adjusted. At this time the operator may want to adjust R9. This is done by pulling on the small knob 101 to bring the disk 102 into engagement with the disk 99 and then rotating the knob 101. Such adjustment of R9 could of course also be done with the parts in the positions in Figs. 11 and 13. However, since a special effort is required the operator is not likely to attempt adjustment of R9 until the proper time. Thereafter the carriage is moved to position III, Fig. 13. Both R11 and R8 are now automatically excluded from being adjusted. At this time the operator will concentrate upon adjustment of the logarithmic resistor R7 and turn the knobs 25 and 27.

The mechanism in Figs. 11 to 13 is of advantage in that in position I it provides adjustment for practically only one of the resistances, namely R11. In position II operation of R11 is prevented and R8 may be adjusted. The separate means for regulating R9 provides sufficient warning for adjusting R9 only at the proper time. With reference to the entire disclosure it is pointed out that the mechanical arrangements and parts are merely illustrative of suitable mechanisms for accomplishing the objects of the invention. Such arrangements are obviously susceptible of modifications and changes without departing from the principle of the invention and the scope of the appended claims.

I claim:

1. In a photoelectric photometer, a high vacuum photoelectric cell, means for directing a beam of light towards the same, means for interposing a colored translucent body for examination in said light beam, a plurality of movable color filters having different selected spectral ranges including that which is absorbed by said body, means for moving said filters to selectively interpose one of them having the same spectral range as said body in the light beam between said light directing means and said cell, an electric circuit for supplying potential to the cell, means in said circuit for amplifying the resulting photoelectric current, a plurality of resistances for varying said resulting photoelectric current in response to the spectral ranges of said color filters, connecting means operatively connecting said resistances and said color filter moving means to automatically include in said circuit a resistance corresponding to the color filter selected when the latter is positioned in said light beam, a shaft for actuating said filter moving means, a casing enclosing all of the aforesaid elements, a knob on the outside of the casing attached to the shaft for operating the same, filter indicating marks on said casing and a mark on said knob adapted to register with any one of the marks aforesaid to indicate the filter interposed as aforesaid.

2. In a photoelectric photometer, a high vacuum photoelectric cell, a lamp for directing a beam of light towards the same, means for interposing a colored translucent body for examination in said light beam, a plurality of movable color filters having different selected spectral ranges including that which is absorbed by said body, means for moving said filters to selectively interpose in said light beam the one filter with the same spectral range as said colored body between said lamp and said cell, an electric circuit for supplying potential to the cell, a plurality of resistances for varying the resulting photoelectric current in response to the spectral ranges of said filters, connecting means operatively connecting said filter moving means and said resistances for automatically including in the circuit that one of said resistances which together with the selected filter produces a substantially constant signal voltage in the circuit, means in the latter for amplifying the said signal voltage, a shaft for actuating said filter moving means, a casing enclosing all of the aforesaid elements, a knob on the outside of the casing attached to the shaft for operating the same, filter indicating marks on said casing and a mark on said knob adapted to register with any one of the marks aforesaid to indicate the filter interposed as aforesaid.

3. In a photoelectric photometer, a high vacuum photoelectric cell, means for directing a beam of light towards the same, an electric circuit for supplying potential to said cell including means for amplifying the resulting photoelectric current, a movable carriage, a black-out portion and two absorption cells containing solutions of different degrees of translucency mounted upon said carriage, means for moving the carriage to selectively interpose in said light beam either the black-out portion or one of said absorption cells, a plurality of variable resistances adapted to be included in said amplifying means to adjust the same in response to the variations in light intensity of said light beam in proportion to the degree of translucency of either one of said interposed bodies, a switch connected to said amplifying means and adapted to connect with any one of said resistances, mechanism operatively connecting said carriage and said switch to automatically operate the switch to connect a predetermined resistance with said amplifying means to adjust the same as aforesaid when said carriage is moved to interpose one of said bodies, means for moving the carriage, means for regulating said predetermined resistance and a meter for indicating the response of the photoelectric cell to the said adjustment of the amplifying means.

4. In a photoelectric photometer, a high vacuum photoelectric cell, means for directing a beam of light towards the same, an electric circuit for supplying potential to said cell including means for amplifying the resulting photoelectric current, three selected bodies of different degrees of translucency, a movable carriage supporting said bodies and adapted to be selectively moved into one of three different predetermined positions to interpose one of said bodies in said light beam, a plurality of variable resistances adapted to be included in said amplifying means to adjust the same in response to variations in light intensity in said light beam caused by the interposition therein of any one of said bodies, a switch connected to said amplifying means and movable selectively into one of three different predetermined positions corresponding to the three positions of said carriage to connect with certain of said resistances when said carriage is moved, mechanism operatively connecting said switch and said carriage to automatically move the switch to connect with a predetermined resistance of said resistances and include the same in said amplifying means to vary the same as aforesaid in proportion to the degree of translucency of the interposed body, means for moving said carriage, means for regulating said predetermined resistance and a meter for indicating the extent of said adjustment of the amplifying means.

5. In a photoelectric photometer, a high vacuum photoelectric cell, a lamp for directing a beam of light towards the same, an electric circuit for supplying potential to said cell including means for amplifying the resulting photoelectric current, a plurality of bodies having different degrees of translucency, means for interposing one of said bodies in said light beam, a plurality of color filters having different spectral ranges including that which is absorbed by said interposed body, means for moving said filters to interpose one of them having the same spectral range as said body in said light beam, a plurality of resistances for varying said resulting photoelectric current in response to the spectral ranges of said color filters, mechanism for operatively connecting said resistances and said filter moving means to automatically include in said amplifying means a resistance corresponding to the spectral range of said interposed color filter, a plurality of variable resistances adapted to adjust said amplifying means in response to variations in light intensity of said light beam caused by the interposition of said translucent body therein and mechanism operatively connecting said variable resistances and said body interposing means to automatically include in said electric circuit to adjust said amplifying means as aforesaid in proportion to the degree of translucency of said interposed body, manually actuated means for operating the said two mechanisms and means for indicating the extent of said adjustment.

6. A photoelectric photometer according to claim 5 in which one of said variable resistances is a logarithmically wound slide wire resistor.

7. In a photoelectric photometer, a high vacuum photoelectric cell, a lamp for directing a beam of light towards the same, an electric circuit for supplying potential to said cell including means for amplifying the resulting photo current, means for interposing a colored translucent body for examination in said light beam, a plurality of color filters having different selected spectral ranges including that which is absorbed by said colored body, means for moving said filters to selectively interpose in said light beam one of them having the same spectral range as said body, a plurality of resistances for varying said resulting photo current in response to the spectral ranges of said color filters, mechanism operatively connecting said filter moving means and said resistances to automatically select and include in said circuit only that one of said resistances which corresponds to the color filter selected when the latter is interposed in said light beam and means for varying one of the said plurality of resistances.

8. In a photoelectric photometer, a high vacuum photoelectric cell, a lamp for directing a beam of light towards the same, an electric circuit for supplying potential to said cell including means for amplifying the resulting photoelectric current, a plurality of translucent bodies of different degrees of translucency, means for selectively interposing one of said bodies in said light beam, a plurality of resistances for adjusting said amplifying means to approximately compensate for variations in light intensity in said light beam caused by the interposition therein of one of said bodies, means for varying said resistances to effect complete compensation of said variations in proportion to the degrees of translucency of said bodies and mechanism operatively connecting said body interposing means and said resistances to automatically select and include in said circuit only those of said resistances which are capable of adjusting said amplifying means proportional to the degree of translucency of said interposed body when the latter is positioned in the light beam and a meter for indicating the extent of the said adjustments.

9. In a photoelectric photometer, a high vacuum photoelectric cell, a lamp for directing a beam of light towards the same, an electric circuit for supplying potential to said cell including means for amplifying the resulting photoelectric current, a plurality of bodies of different degrees of translucency, a movable carriage for selectively interposing any one of said bodies in said light beam, two variable resistances adapted to be selectively included in said amplifying means to approximately compensate for variations in light intensity of said light beam caused by the interposition therein of any one of said bodies, means for varying said resistances to effect complete compensation for said variations, means for actuating said resistance varying means, mechanism connecting said carriage and said actuating means for automatically positioning the latter in operative relation to only that one resistance which is to be varied when a selected body is interposed in the light beam as aforesaid, means for operating said carriage and a meter in said circuit for indicating the extent of said adjustment.

RALPH H. MÜLLER.